United States Patent
Takeshita (10) Patent No.: US 11,726,741 B2
(45) Date of Patent: Aug. 15, 2023

(54) AGENT CONTROL DEVICE, AGENT CONTROL METHOD, AND RECORDING MEDIUM

(71) Applicant: TOYOTA JIDOSHA KABUSHIKI KAISHA, Toyota (JP)

(72) Inventor: Kohki Takeshita, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 86 days.

(21) Appl. No.: 17/241,663

(22) Filed: Apr. 27, 2021

(65) Prior Publication Data

US 2021/0354712 A1     Nov. 18, 2021

(30) Foreign Application Priority Data

May 18, 2020    (JP) ................................ 2020-086990

(51) Int. Cl.
    *B60W 50/14*     (2020.01)
    *H04W 4/80*     (2018.01)
    *G06F 3/16*     (2006.01)

(52) U.S. Cl.
    CPC .............. *G06F 3/167* (2013.01); *B60W 50/14* (2013.01); *H04W 4/80* (2018.02); *B60K 2370/56* (2019.05); *B60K 2370/563* (2019.05); *B60K 2370/589* (2019.05); *B60W 2050/146* (2013.01)

(58) Field of Classification Search
None
See application file for complete search history.

(56) References Cited

U.S. PATENT DOCUMENTS

| | | | |
|---|---|---|---|
| 7,826,945 B2* | 11/2010 | Zhang | G06F 3/16 715/728 |
| 9,564,129 B2* | 2/2017 | Amano | G10L 15/222 |
| 9,641,678 B2* | 5/2017 | Berry | H04M 3/4936 |
| 11,423,470 B1* | 8/2022 | Boyd | H04N 7/15 |
| 2006/0155665 A1* | 7/2006 | Sekiyama | G05D 1/0088 706/59 |
| 2007/0005206 A1* | 1/2007 | Zhang | G08G 1/09675 701/1 |
| 2013/0212050 A1* | 8/2013 | Sekiyama | G06N 20/00 706/12 |

(Continued)

FOREIGN PATENT DOCUMENTS

| | | | | |
|---|---|---|---|---|
| CN | 1745564 B | * | 12/2010 | ....... H04L 29/06027 |
| CN | 108184193 A | * | 6/2018 | .......... H04M 1/7253 |

(Continued)

OTHER PUBLICATIONS

YouTube Webpage, "Toyota Entune | Bluetooth Android Pairing | Toyota", Mar. 3, 2019, https://www.youtube.com/watch?v=6Up3Au0t9Aw.*

*Primary Examiner* — Kevin R Steckbauer
(74) *Attorney, Agent, or Firm* — Sughrue Mion, PLLC (57) ABSTRACT

An agent control device that acquires a request signal requesting establishment of communication between a mobile terminal and an onboard device; responds to the request signal so as to present, on a display device, a display screen showing procedure information used to set up and establish communication between the mobile terminal and the onboard device; and performs control to continue operation of an agent that is operational inside a vehicle while the display screen is being presented.

6 Claims, 5 Drawing Sheets

(56) References Cited

U.S. PATENT DOCUMENTS

| | | | | |
|---|---|---|---|---|
| 2016/0322048 | A1* | 11/2016 | Amano | G10L 15/08 |
| 2017/0242651 | A1* | 8/2017 | Lang | G06F 3/165 |
| 2021/0354712 | A1* | 11/2021 | Takeshita | H04W 4/80 |
| 2022/0012313 | A1* | 1/2022 | Miyahara | G06F 3/04883 |

FOREIGN PATENT DOCUMENTS

| | | | | | |
|---|---|---|---|---|---|
| CN | 111757305 | A | * | 10/2020 | |
| CN | 113220848 | A | * | 8/2021 | |
| CN | 113271380 | A | * | 8/2021 | G06F 3/165 |
| CN | 113821184 | A | * | 12/2021 | |
| CN | 113923612 | A | * | 1/2022 | |
| JP | 2006195578 | A | * | 7/2006 | G06N 99/005 |
| JP | 2018-189984 | A | | 11/2018 | |
| JP | 2018189984 | A | * | 11/2018 | G06F 3/167 |
| JP | 2019159559 | A | * | 9/2019 | |
| JP | 2020154942 | A | * | 9/2020 | |
| JP | 2020160135 | A | * | 10/2020 | G10L 15/22 |
| WO | 2020/026402 | A1 | | 2/2020 | |
| WO | WO-2020026402 | A1 | * | 2/2020 | F16K 21/06 |
| WO | WO-2021180083 | A1 | * | 9/2021 | |

\* cited by examiner

AGENT CONTROL DEVICE, AGENT CONTROL METHOD, AND RECORDING MEDIUM

CROSS-REFERENCE TO RELATED APPLICATION

This application is based on and claims priority under 35 USC 119 from Japanese Patent Application No. 2020-086990 filed on May 18, 2020, the disclosure of which is incorporated by reference herein.

BACKGROUND

Technical Field

The present disclosure relates to an agent control device, an agent control method, and a recording medium.

Related Art

Technology for controlling operation of two agents is known. One example of such known technology is a speech interaction method for utilizing services provided by two agents in which agent information such as a keyword used to identify an agent is employed to decide which out of the two agents should respond (see, for example, Japanese Patent Application Laid-Open (JP-A) No. 2018-189984).

The agents disclosed in JP-A No. 2018-189984 may, for example, be utilizable inside a vehicle. When an agent is utilized inside a vehicle, the agent performs speech interaction with a user, and executes processing that reflects the content of this interaction. The agent then uses equipment inside the vehicle to output an execution result of this processing so as to reflect the interaction content.

A mobile terminal of a user and an onboard device inside the vehicle may be connected using short range communication when the user is on board the vehicle. In such cases, for example, a display device such as a car navigation system inside the vehicle may display a guidance screen used when setting up short range communication between the mobile terminal and the vehicle, and start speech navigation in order to set up this short range communication.

However, the user may make an utterance or wish to interact with the agent inside the vehicle while such a guidance screen is being displayed. It is therefore not desirable to stop operation of the agent while the guidance screen to set up short range communication is being displayed.

The technology disclosed in JP-A No. 2018-189984 does not consider the behavior of an agent while setting up a short range communication connection between a mobile terminal of a user and an onboard device. Accordingly, with the technology disclosed in JP-A No. 2018-189984 an issue may arise where smooth utilization of an agent is not possible while setting up a short range communication connection between the mobile terminal of the user and an onboard device inside the vehicle.

SUMMARY

An aspect of the disclosure is an agent control device that includes: a memory; and a processor coupled to the memory. The processor is configured to acquire a request signal requesting establishment of communication between a mobile terminal and an onboard device, respond to the request signal so as to present, on a display device, a display screen showing procedure information used to set up and establish communication between the mobile terminal and the onboard device, and perform control to continue operation of an agent that is operational inside a vehicle while the display screen is being presented.

BRIEF DESCRIPTION OF THE DRAWINGS

Exemplary embodiments of the present disclosure will be described in detail based on the following figures, wherein.

DETAILED DESCRIPTION

Exemplary Embodiment

Explanation follows regarding an agent control system of an exemplary embodiment, with reference to the drawings.

Figure 1:
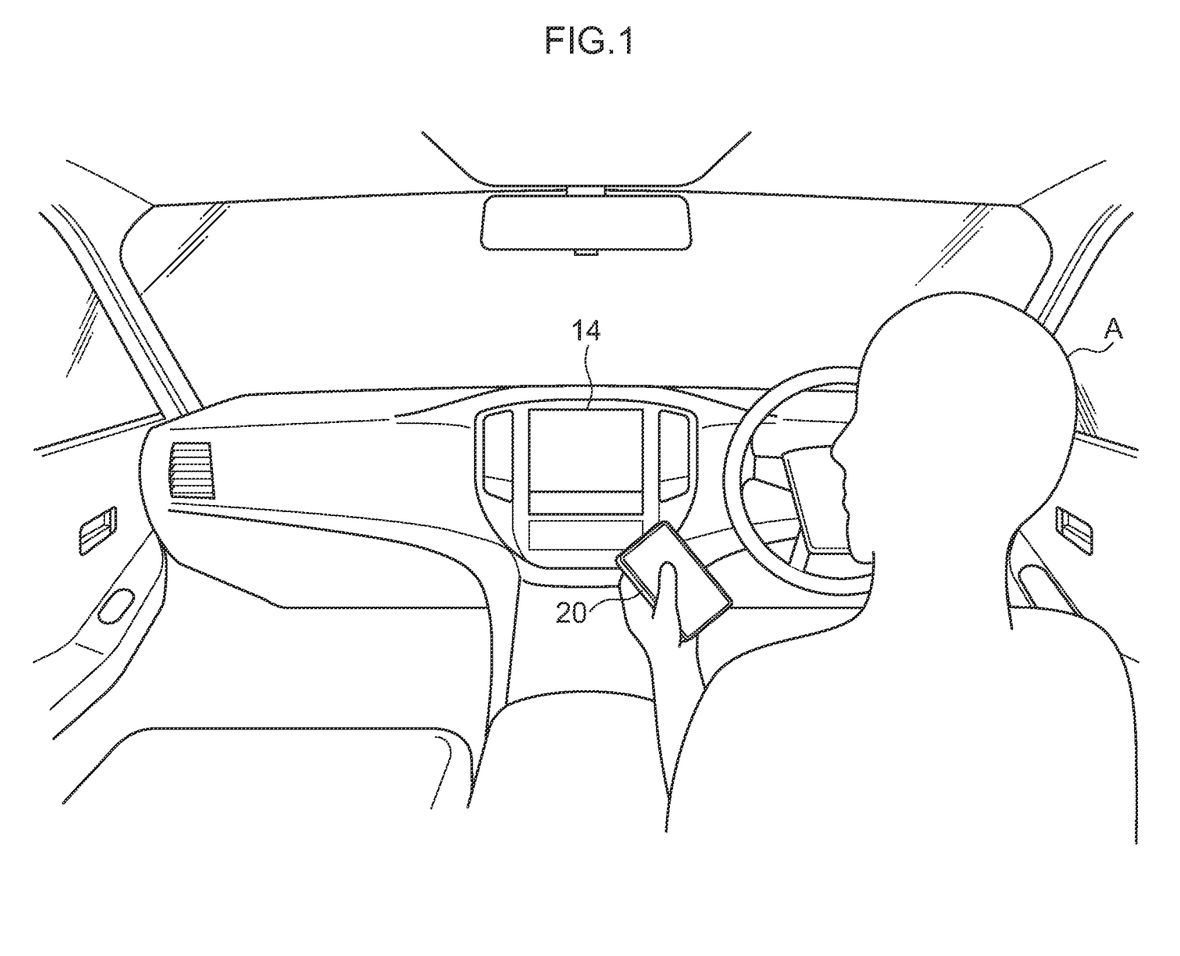
FIG. 1 is an explanatory diagram to provide schematic explanation of an exemplary embodiment.

FIG. 1 is an explanatory diagram to provide schematic explanation of the present exemplary embodiment. FIG. 1 is a diagram illustrating a situation in which a user A is on board a vehicle. The user A possesses a mobile terminal 20 such as a smartphone. FIG. 1 also illustrates a touch panel 14, this being an example of a display device that displays various information, located inside the vehicle. The touch panel 14 and the mobile terminal 20 are connected to an agent control device, described later. The display device is not limited to a touch panel. The display device can be any presenter that can present or display various information.

In the present exemplary embodiment, the user A, this being an occupant of the vehicle, utilizes an agent capable of performing speech interaction. The agent of the present exemplary embodiment performs speech interaction with the user A, and executes processing that reflects the content of this interaction. The agent then uses equipment inside the vehicle to output an execution result of this processing so as to reflect the interaction content. The agent of the present exemplary embodiment is implemented by an agent server, described later, executing a predetermined program.

The user A may wish to set up a communication connection between their mobile terminal 20 and an onboard device (not illustrated in the drawings) inside the vehicle when the user A is on board the vehicle. For example, the mobile terminal 20 and the onboard device (not illustrated in the drawings) inside the vehicle may be capable of connecting via Bluetooth (registered trademark), this being an example of short range communication. In such cases, for example a guidance screen for setting up short range communication is displayed on the touch panel 14 inside the vehicle and speech navigation for setting up the short range communication is started.

However, the user may make some kind of utterance or wish to interact with the agent inside the vehicle while the guidance screen is being displayed. It is therefore not desirable to stop operation of the agent while the guidance screen for setting up the short range communication is being displayed.

The agent control device of the present exemplary embodiment performs control so as to continue operation of a utilizable agent inside the vehicle even when the user A on board the vehicle is establishing communication between the mobile terminal 20 and the onboard device. This enables the user A to utilize the utilizable agent inside the vehicle smoothly.

Detailed explanation thereof follows below.

Figure 2:
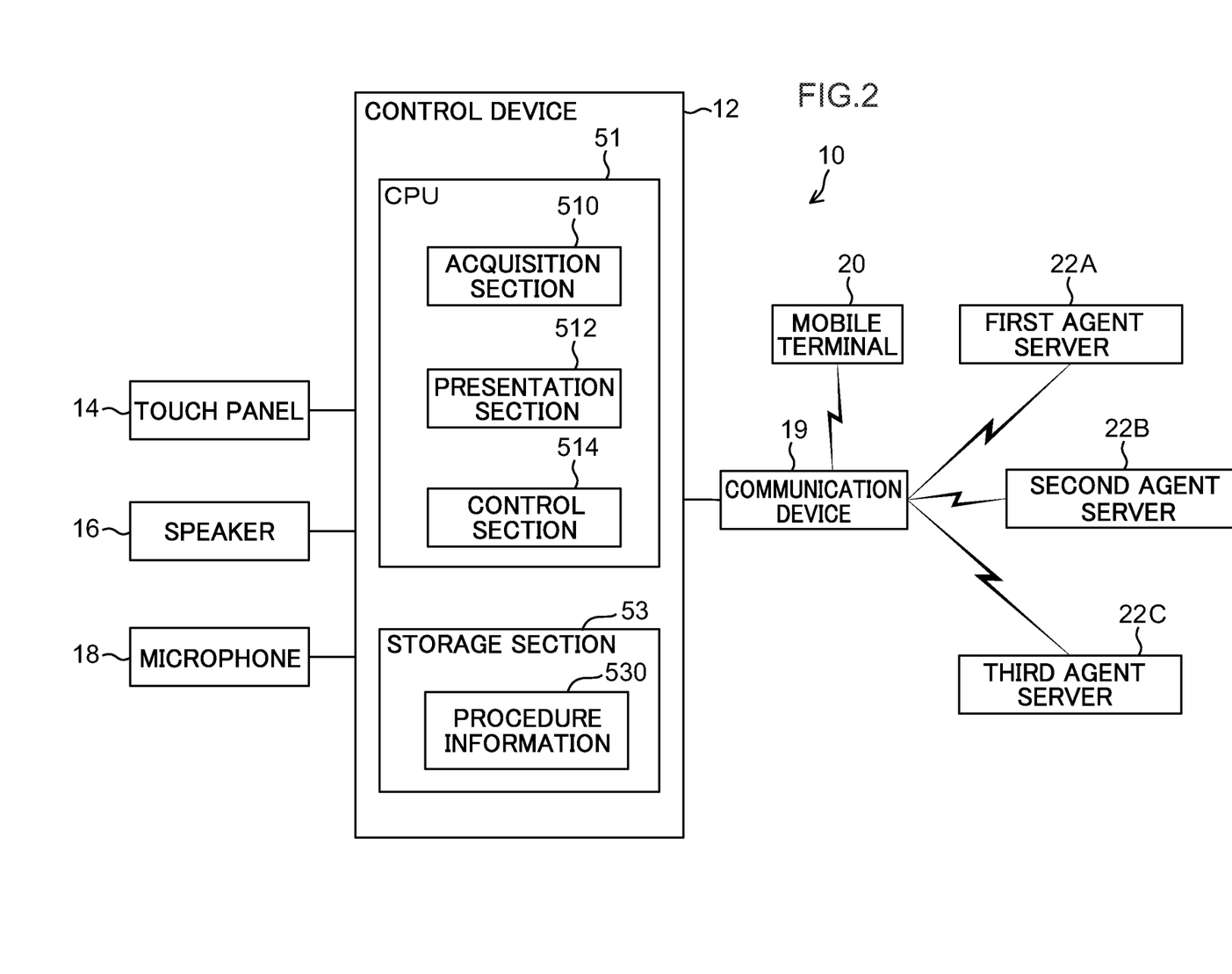
FIG. 2 is a schematic block diagram illustrating an example of a control system according to an exemplary embodiment.

FIG. 2 is a block diagram illustrating an example of configuration of a control system 10 according to the exemplary embodiment. As illustrated in FIG. 2, the control system 10 includes a control device 12, this being an example of an agent control device, the touch panel 14, a speaker 16, a microphone 18, a communication device 19, this being an example of an onboard device, the mobile terminal 20, a first agent server 22A, a second agent server 22B, and a third agent server 22C. The control device 12, the touch panel 14, the speaker 16, the microphone 18, and the communication device 19 are all installed in a single vehicle.

Control Device

As illustrated in FIG. 2, the control device 12 includes a central processing unit (CPU) 51 and a storage section 53.

Figure 3:
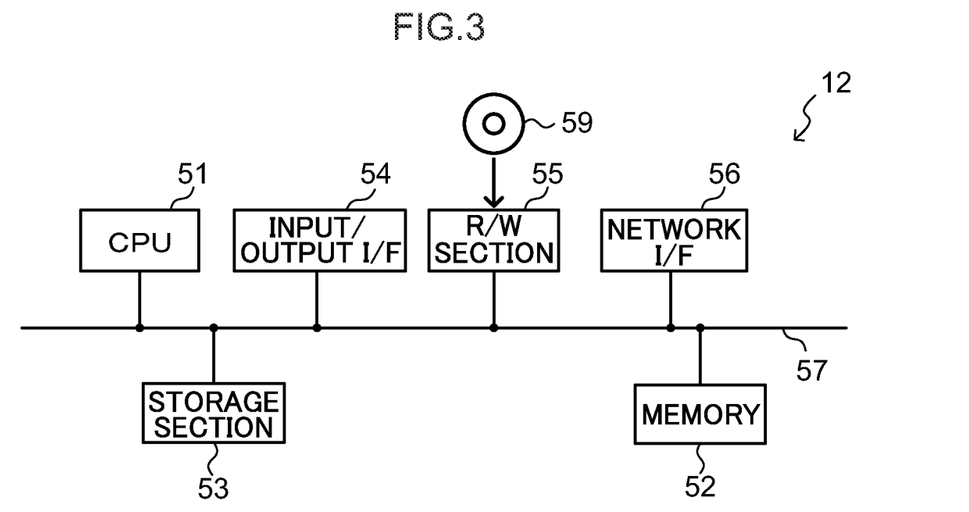
FIG. 3 is a diagram illustrating an example of configuration of a computer of a control device.

More specifically, the control device 12 may for example be implemented by a computer such as that illustrated in FIG. 3. The computer that implements the control device 12 includes the CPU 51, this being an example of a hardware processor, memory 52 serving as a temporary storage region, and the non-volatile storage section 53. The computer also includes an input/output interface (I/F) 54 to which an input/output device and so on are connected, and a read/write (R/W) section 55 that controls reading and writing of data on a recording medium 59. The computer also includes a network I/F 56 that is connected to a network such as the internet. The CPU 51, the memory 52, the storage section 53, the input/output I/F 54, the R/W section 55, and the network I/F 56 are connected to each other through a bus 57.

The storage section 53 may be implemented by a hard disk drive (HDD), a solid state drive (SSD), flash memory, or the like, these being examples of a non-transitory recording medium. The storage section 53 serves as a storage medium stored with a program causing the computer to implement functionality. The CPU 51 reads the program from the storage section 53, expands the program in the memory 52, and sequentially executes processes included in the program. The program may for example be recorded on a non-transitory recording medium such as a digital versatile disc (DVD), and read into the HDD, SSD, or the like from this non-transitory recording medium using a recording medium reader device.

As illustrated in FIG. 2, the CPU 51 of the control device 12 loads the program from the storage section 53 and executes the program using the memory 52 as a workspace in order to function as an acquisition section 510, a presentation section 512, and a control section 514. Processing performed by the acquisition section 510, the presentation section 512, and the control section 514 is described later.

As illustrated in FIG. 2, the storage section 53 of the control device 12 is stored with procedure information 530 used to set up and establish communication between the mobile terminal 20 and the communication device 19. The procedure information 530 will be described later.

The touch panel 14 is connected to the control device 12 through the input/output I/F 54. The touch panel 14 displays images as appropriate. The touch panel 14 also receives operation information from a user.

The speaker 16 is connected to the control device 12 through the input/output I/F 54, and outputs audio.

The microphone 18 is connected to the control device 12 through the input/output I/F 54, and picks up speech uttered inside the vehicle.

The communication device 19 is connected to the control device 12 through the network I/F 56. The control device 12 exchanges information with the first agent server 22A, the second agent server 22B, and the third agent server 22C via the communication device 19. Note that the communication device 19 and the first agent server 22A, the second agent server 22B, and the third agent server 22C may for example be connected together over a communication line such as the internet.

Similarly, the control device 12 and the mobile terminal 20 exchange information via the communication device 19. The control device 12 and the mobile terminal 20 are, for example, connected using a predetermined short range communication protocol. For example, by establishing communication between the control device 12 and the mobile terminal 20, functionality of the mobile terminal 20 to be utilized inside the vehicle via the control device 12. For example, a screen utilizing functionality of the mobile terminal 20 may be displayed on the touch panel 14.

Agent Servers

As illustrated in FIG. 2, the control system 10 of the present exemplary embodiment includes the first agent server 22A, the second agent server 22B, and the third agent server 22C.

The first agent server 22A, the second agent server 22B, and the third agent server 22C are all servers that operate agents. The respective agents are implemented by the first agent server 22A, the second agent server 22B, and the third agent server 22C each executing a predetermined program. In the present exemplary embodiment, the agent X is operated by the first agent server 22A, the agent Y is operated by the second agent server 22B, and the agent Z is operated by the third agent server 22C.

Mobile Terminal

The mobile terminal 20 is for example a smartphone in the possession of and regularly used by a user inside the vehicle.

Next, explanation follows regarding operation of the control system 10 of the exemplary embodiment.

The control device 12 operates one agent out of the agent X, the agent Y, and the agent Z on receipt of a signal indicating that the user will utilize an agent inside the vehicle. Note that when this occurs, for example, the control device 12 operates the agent designated by the user out of the agent X, the agent Y, and the agent Z.

Figure 4:
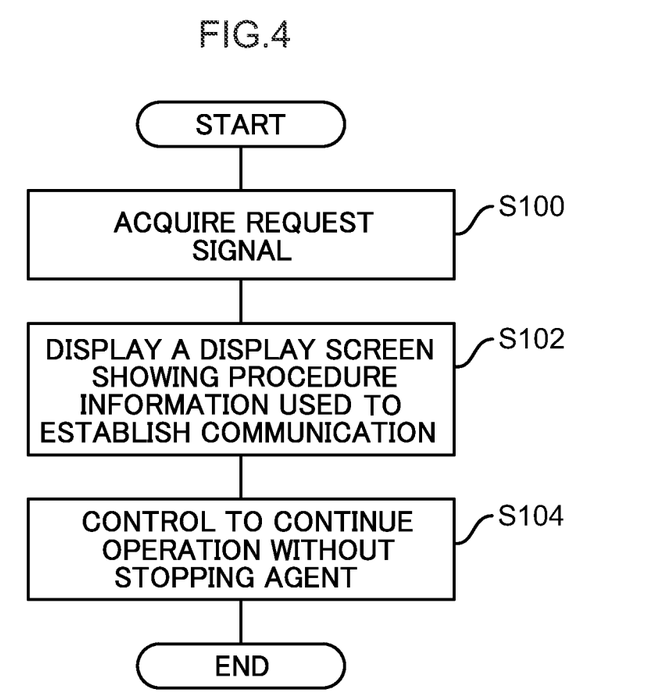
FIG. 4 is a flowchart illustrating an example of processing performed by a control device according to an exemplary embodiment.

When a request signal requesting the establishment of communication between the mobile terminal 20 and the communication device 19 is output from the mobile terminal 20, the control device 12 executes the control processing routine illustrated in FIG. 4.

At step S100, the acquisition section 510 of the CPU 51 of the control device 12 acquires the request signal output from the mobile terminal 20.

At step S102, the presentation section 512 of the CPU 51 of the control device 12 responds to the request signal acquired at step S100 and reads the procedure information 530 used to set up and establish communication between the mobile terminal 20 and the communication device 19 from the storage section 53. The presentation section 512 of the CPU 51 then controls the touch panel 14 so as to display a display screen showing the procedure information 530. The display screen showing the procedure information 530 is thus presented to the user.

Figure 5:
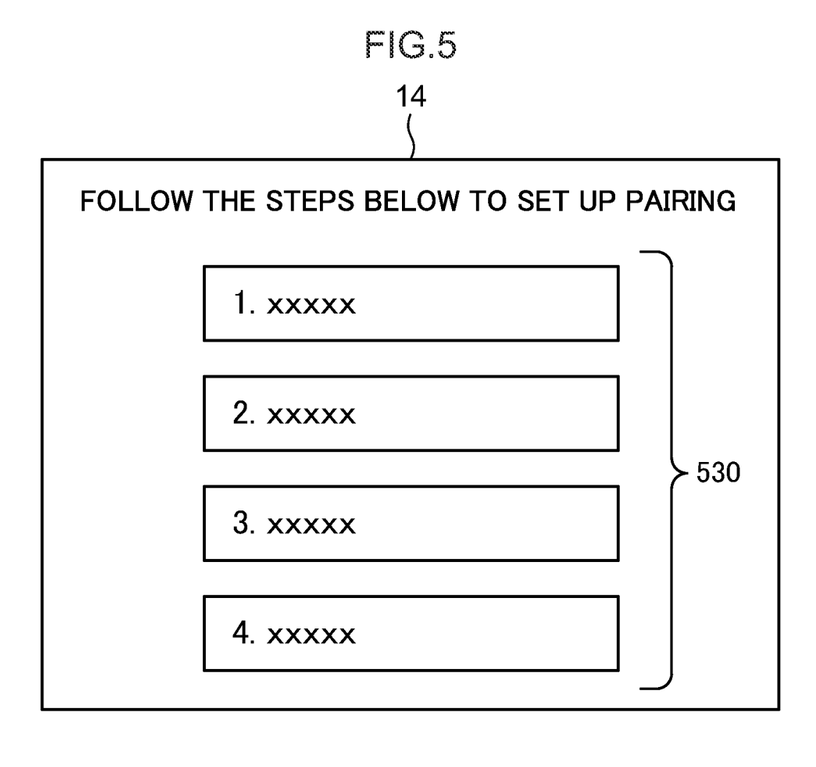
FIG. 5 is a diagram illustrating an example of a screen displayed on a touch panel.

For example, the presentation section 512 displays procedure information 530 used to set up and establish communication between the mobile terminal 20 and the communication device 19 on the touch panel 14 as illustrated in FIG. 5.

At step S104, the control section 514 of the CPU 51 of the control device 12 performs control such that operation of an agent that was already operational inside the vehicle continues while the display screen of step S102 is being presented. This enables smooth utilization of the agent by the user due to continuing operation of the agent that the user was interacting with a short time prior.

This enables the user and the agent to interact inside the vehicle via the speaker 16 and the microphone 18, thus allowing the user to utilize the agent even during the process of establishing communication between the mobile terminal 20 and the communication device 19.

As described above, the control device 12 of the control system 10 according to the present exemplary embodiment acquires the request signal requesting establishment of communication between the mobile terminal and the onboard device. The control device 12 responds to the request signal so as to present the display screen showing the procedure information used to set up and establish communication between the mobile terminal and the onboard device. The control device 12 also performs control to continue operation of the agent that is operational inside the vehicle while the procedure information display screen is being presented. This enables the user to utilize the agent smoothly even when setting up a short range communication connection between the mobile terminal of the user and the onboard device inside the vehicle.

Although explanation has been given in which the processing performed by the respective devices is software processing performed by executing a program in the exemplary embodiment described above, the processing may be performed by hardware. Alternatively, the processing may be performed by a combination of both software and hardware. Moreover, a program stored in ROM may be distributed in a format stored on a non-transitory recording medium.

The present disclosure is not limited to the above description, and various other modifications may be implemented within a range not departing from the spirit of the present disclosure.

An object of the present disclosure is to provide an agent control device, an agent control method, and a non-transitory recording medium that enable smooth utilization of an agent even while setting up a short range communication connection between a mobile terminal of a user and an onboard device inside a vehicle.

A first aspect of the disclosure is an agent control device that includes: a memory; and a processor coupled to the memory. The processor is configured to acquire a request signal requesting establishment of communication between a mobile terminal and an onboard device, respond to the request signal so as to present, on a display device, a display screen showing procedure information used to set up and establish communication between the mobile terminal and the onboard device, and perform control to continue operation of an agent that is operational inside a vehicle while the display screen is being presented.

The agent control device acquires the request signal requesting establishment of communication between the mobile terminal and the onboard device. The agent control device responds to the request signal so as to present the display screen showing procedure information used to set up and establish communication between the mobile terminal and the onboard device. The agent control device performs control to continue operation of the agent that is operational inside the vehicle while the display screen is being presented. The agent control device of the first aspect enables smooth utilization of the agent even while setting up a short range communication connection between the mobile terminal of the user and the onboard device inside the vehicle. Note that the agent of the present aspect performs speech interaction with the user, and executes processing that reflects the content of this interaction. The agent then uses equipment inside the vehicle to output an execution result of this processing so as to reflect the interaction content. The agent is implemented by predetermined computer executing a program.

A second aspect of the disclosure is the agent control device of the first aspect, wherein a plurality of agents are utilizable inside the vehicle; and the processor is configured to perform control to continue operation of an agent that is already operational inside the vehicle. The agent control device of the second aspect enables smooth utilization of the agent by the user due to continuing operation of the agent that the user was interacting with a short time prior.

The first and second aspects may also be implemented by a method or a program recorded on a non-transitory recording medium.

As described above, the present disclosure exhibits the advantageous effect of enabling smooth utilization of an agent even while setting up a short range communication connection between a mobile terminal of a user and an onboard device inside a vehicle.

What is claimed is:

1. An agent control device comprising:
a memory; and
a processor coupled to the memory, the processor being configured to:
acquire a request signal requesting establishment of communication between a mobile terminal and an onboard device of a vehicle,
respond to the request signal so as to present, on a display device, a display screen showing procedure information used to set up and establish communication between the mobile terminal and the onboard device, and
while the display screen showing the procedure information is being presented, perform control to continue operation, in response to speech received from a user in the vehicle, of an agent that was already operational inside the vehicle and configured to perform speech interaction with the user in the vehicle before the request signal was acquired.

2. The agent control device of claim 1, wherein:
a plurality of agents are configured for use inside the vehicle; and
the processor is configured to perform control to continue operation of an agent that is was already operational inside the vehicle.

3. An agent control method, comprising:
by a processor,
acquiring a request signal requesting establishment of communication between a mobile terminal and an onboard device of a vehicle;
responding to the request signal so as to present, on a display device, a display screen showing procedure information used to set up and establish communication between the mobile terminal and the onboard device; and while the display screen showing the procedure information is being presented, performing control to continue operation, in response to speech received from a user in the vehicle, of an agent that was already operational inside the vehicle and configured to perform speech interaction with the user in the vehicle before the request signal was acquired.

4. The agent control method of claim 3, wherein:

a plurality of agents are configured for use inside the vehicle; and control is performed to continue operation of an agent that was already operational inside the vehicle.

5. A non-transitory recording medium storing a program that is executable by a computer to perform processing, the processing comprising:

acquiring a request signal requesting establishment of communication between a mobile terminal and an onboard device of a vehicle;

responding to the request signal so as to present, on a display device, a display screen showing procedure information used to set up and establish communication between the mobile terminal and the onboard device; and while the display screen showing the procedure information is being presented, performing control to continue operation, in response to speech received from a user in the vehicle, of an agent that was already operational inside the vehicle and capable of speech interaction with the user in the vehicle before the request signal was acquired.

6. The non-transitory recording medium of claim 5, wherein:

a plurality of agents are configured for use inside the vehicle; and control is performed to continue operation of an agent that was already operational inside the vehicle.

* * * * *